June 7, 1938.   H. E. GOLDSTINE   2,119,576
INDICATING DIAL
Filed April 6, 1937

INVENTOR
HALLAN E. GOLDSTINE
BY
ATTORNEY

Patented June 7, 1938

2,119,576

UNITED STATES PATENT OFFICE 2,119,576

INDICATING DIAL

Hallan Eugene Goldstine, Port Jefferson Station, N. Y., assignor to Radio Corporation of America, a corporation of Delaware Application April 6, 1937, Serial No. 135,213

20 Claims. (Cl. 116—124.2)

This invention relates to a new and novel type of indicating dial and indicating mechanism contained therein.

An object of this invention is to provide an improved form of indicating dial containing a counter mechanism which will be useful to indicate in numerals the position of a movable element.

Another object of this invention is to improve the existing forms of indicating dials and to increase the precision thereof. The usual type of dial known in the prior art is calibrated for one-half its revolution or some fraction of a revolution of the dial. When precision is required or where a large range of adjustment is necessary, a dial of the type known in the prior art is not suitable, because a large number of revolutions may be necessary in obtaining the desired setting, and the usual type of dial does not have sufficient range. Also, in the operation, it is important to have a dial which will indicate the number of revolutions made in turning the dial to a given setting, so that a reset of the dial or re-location of a given position may be made by reference to certain numerals on an indicator.

Briefly, this invention comprises an improved indicating dial having a rotatable dial on which is suitably mounted an operating knob. Located within a hollow portion of the knob is an indicator or counting mechanism which is fixed with respect to the rotatable disc to indicate the number of revolutions made by the dial. In other words, the knob and dial plate rotate about the fixed counter to indicate the number of revolutions made by the knob. The counter mechanism may be mounted to a mounting panel or other supporting surface. A type of indicating dial mechanism is particularly adapted for the control of radio apparatus, as will be described below, such as receivers and transmitters, wherein it is necessary to have an indication of the position or degree of the movable circuit elements, such as the movable element of a capacitor or inductor.

This invention will best be understood by referring to the accompanying drawing, in which.

Figure 1:
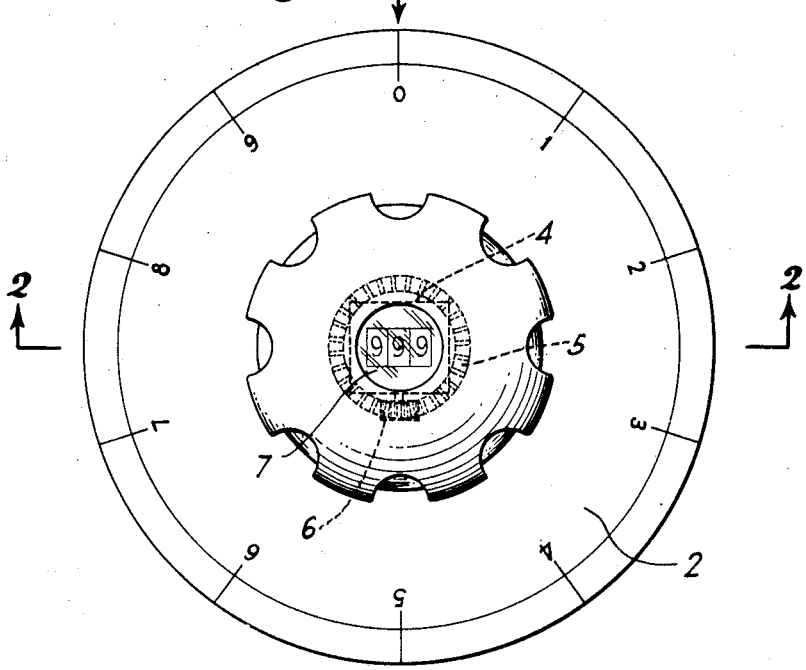
Fig. 1 is a front view of the dial mechanism.
Figure 2:
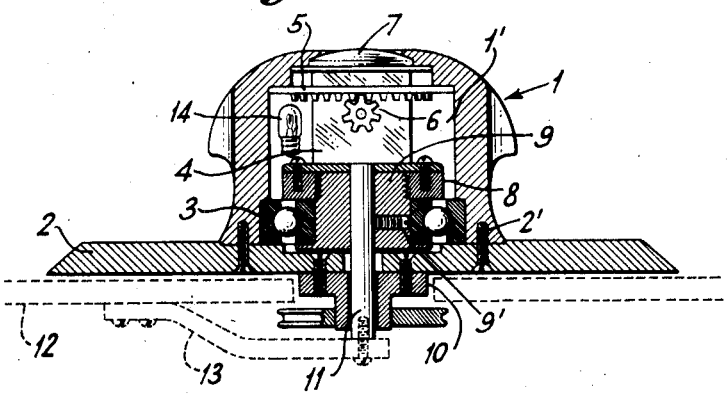
Fig. 2 is a cross-section of Fig. 1.

Referring now in detail to the drawing, a knob I is secured to a dial plate 2 by means of suitable screws 2'. Dial plate 2 is mechanically attached to a rotating shaft 10, so that when knob I is turned, shaft 10 moves the movable circuit element which is to be adjusted. Knob I and dial plate 2 may be made of any suitable material, such as an aluminum alloy, to lighten the weight of the assembly. On the surface of dial plate 2, a number of figures may be inscribed on the periphery so that a given rotation of the dial may be sub-divided into any suitable number of segments, such as for example, ten equal divisions. Located within a hollow aperture I' is a three figure counter 4. This counter is geared for rotation at any suitable ratio, for example, 6.25 to 1, so that it is necessary to turn the counter shaft 6.25 times before the number or digit on the right of the counter mechanism indicates one revolution. The counter mechanism 4 is mounted by means of a supporting ring 8 which is mounted and held in position by means of a ball thrust bearing 3. A collar 9 is threaded to ring 8 and also threaded for a set screw 9' which secures it to counter shaft 11. The thrust bearing 3 supports and centers the supporting ring 8 for the collar inside the hub. The outer portion of bearing 3 is secured to knob I. A ring gear 5 is mounted so as to be mechanically integral with knob I and as the knob rotates about the counter, ring gear 5 drives a small pinion 6 which is mounted on the end of the shaft of the counter mechanism. When ring gear 5 and knob I have made one complete revolution and the counter shaft 6.25 revolutions, the internal gearing of the counter which is 6.25 revolutions to 1, reduces the ratio so that one revolution of the dial produces one unit indication of the counter digits. The shaft 11 is secured to the base of counter 4 and is held into position behind panel 12 by means of a bracket 13 which prevents counter 4 from revolving and maintains it in a fixed position relative to the observer, or with respect to the panel on which the dial is mounted. Shaft 10 may be arranged to drive a double gear arrangement (not shown), so that shaft 11 may be clamped to an assembly which is stationary with panel 12. To magnify the size of the numeral on the counter, a magnifying glass 7 is provided which improves the visibility of the counter numerals. Whenever it is desired to further increase the visibility of the numerals, a small electric light bulb 14 may be provided to give indirect lighting on the counter numerals.

While only one form of indicating mechanism is shown by the drawing, it is apparent that several modifications of mechanism of this type may be made. For example, the counter may be so arranged and so geared that it rotates directly in terms of capacity or inductance per unit inches of motion; also, any unit of the variable element that is to be changed by means of rotation of the dial may be indicated on dial plate 2 in lieu of the numerals shown in the drawing. Also, numerals and counter may be adopted for increasing in counter-clockwise as well as clockwise rotation.

In the particular showing of the drawing, the counter is provided with three parallel arranged digits which give indications up to nine hundred and ninety-nine turns. This counter naturally will add or subtract so that the same number may be derived on the counter for any particular setting by rotation from either direction. A larger or smaller number of figures on the counter could be provided, if desired.

What is claimed is:

1. An indicating dial comprising a rotatable disc, an operating knob secured to said disc, and an indicating counting mechanism located within said knob and fixed with respect to a panel or stationary surface on which said disc is mounted to indicate the revolutions made by said dial.

2. An indicating dial comprising a rotatable member, an operating knob secured to said rotatable member, and a counter mechanism located on the same axis as said rotatable member, said counter mechanism having revolving numerals to indicate a ratio of the rotatable member revolutions, said counter being fixed with respect to a stationary surface.

3. An indicating dial comprising a rotatable disc, an operating knob secured to said disc, an indicating mechanism having revolving numerals located within said knob and fixed with respect to a panel or stationary surface, and a window located at one end of said knob to indicate numerals on said indicating mechanism.

4. An indicating dial comprising a rotatable disc, an operating knob secured to said disc, indicating mechanism having revolving numerals located within said knob and fixed with respect to a stationary panel, a window located at one end of said knob to display numerals on said indicating mechanism, and means to illuminate the numerals on said indicating mechanism.

5. An indicating dial comprising a rotatable disc having a scale with graduations dividing said dial into segments, an operating knob secured to said disc, an indicating counting mechanism located within said knob and fixed with respect to said rotatable disc for indicating the revolutions made by said dial.

6. An indicating dial comprising a rotatable disc, an operating knob secured to said disc, an indicating mechanism having revolving numerals located within said knob and fixed with respect to a stationary panel, and a window having a lens secured to one end of said knob to magnify the numerals on said indicating mechanism.

7. An indicating dial comprising a rotatable disc, an operating knob secured to said disc, an indicating counting mechanism located within said knob and fixed with respect to a stationary member to indicate the revolutions made by said dial, a shaft secured to the end of said indicating mechanism, a second shaft surrounding said first mentioned shaft and secured to said rotatable knob and disc, and a ball bearing located between said operating knob and said first mentioned shaft.

8. An indicating dial comprising a rotatable disc, an operating knob secured to said disc, an indicating mechanism having a shaft for moving a plurality of indicating numerals, said indicating mechanism located within said knob and being fixed with respect to an observer to indicate the revolutions made by said dial, a pinion gear located on the end of said shaft, a ring gear secured within said knob and engaging the teeth of said pinion so as to rotate said indicating mechanism shaft when said operating knob is rotated.

9. An indicating dial comprising a rotatable disc, an operating knob secured to said disc, an indicating counting mechanism located within said knob and fixed with respect to said rotatable disc to indicate the revolutions made by said dial, a shaft secured to the end of said indicating mechanism, a second shaft surrounding said first mentioned shaft and having means for operating radio apparatus, said second shaft being secured to said rotatable disc, a ball bearing located between said operating knob and said first mentioned shaft.

10. An indicating dial comprising a rotatable disc, an operating knob secured to said disc, an indicating mechanism having a shaft for moving a plurality of indicating numerals, said indicating mechanism located within said knob and being fixed with respect to said rotatable disc to indicate the revolutions made by said dial, a pinion gear located on the end of said shaft, a ring gear secured within said knob and engaging the teeth of said pinion so as to rotate said indicating mechanism shaft when said operating knob is rotated, a fixed shaft secured to said indicating mechanism, and a rotatable shaft connected to said rotatable disc for operating a remotely located movable member.

11. An indicating dial comprising a rotatable disc, an operating knob secured to said disc, an indicating mechanism having a plurality of digits arranged parallel with each other within said knob and fixed with respect to said rotatable disc, and a window located at one end of said knob to indicate the numerals on said indicating mechanism.

12. An indicating dial comprising a rotatable disc, an operating knob secured to said disc, and an indicating counting mechanism located within said knob and fixed with respect to said rotatable disc to indicate the revolutions made by said dial.

13. An indicating dial comprising a rotatable member, an operating knob, and a counter mechanism located concentric with said rotatable member, said counter mechanism having revolving numerals to indicate a ratio of the rotatable member revolutions, said counter being fixed with respect to said rotatable member.

14. An indicating dial comprising a rotatable disc, an operating knob secured to said disc, an indicating mechanism having revolving numerals located within said knob and fixed with respect to said rotatable disc, and a window located at one end of said knob to indicate numerals on said indicating mechanism.

15. An indicating dial comprising a rotatable disc, an operating knob secured to said disc, indicating mechanism having revolving numerals located within said knob and fixed with respect to said rotatable disc, a window located at one end of said knob to indicate numerals on said indicating mechanism, and means to illuminate the numerals on said indicating mechanism.

16. An indicating dial comprising a rotatable disc, an operating knob secured to said disc, an indicating mechanism having revolving numerals located within said knob and fixed with respect to said rotatable disc, and a window having a lens secured to one end of said knob to magnify the numerals on said indicating mechanism.

17. An indicating dial comprising a rotatable disc, an operating knob secured to said disc, an indicating counting mechanism located within said knob and fixed with respect to said rotatable disc to indicate the revolutions made by said dial, a shaft secured to the end of said indicating mechanism, a second shaft surrounding said first mentioned shaft and secured to said rotatable disc, and a ball bearing located between said operating knob and said first mentioned shaft.

18. An indicating dial comprising a rotatable member, an operating knob secured to said rotatable member, an indicating mechanism having revolving reference characters located within said knob and fixed with respect to said rotatable member, and an aperture located in the front of said knob to indicate the reference characters on said indicating mechanism.

19. An indicating dial comprising a rotatable member, an operating knob secured to said rotatable member, an indicating counting mechanism located within said knob and fixed with respect to said rotatable member to indicate the revolutions made by said rotatable member, a shaft secured to the end of said indicating counting mechanism, a second shaft surrounding said first mentioned shaft and secured to said rotatable member, and means to illuminate the numerals on said indicating counting mechanism, said means comprising an electric light bulb located adjacent said indicating counting mechanism.

20. An indicating dial comprising a rotatable member, an operating knob secured to said rotatable member, an indicating mechanism having a shaft for moving a plurality of reference characters, said indicating mechanism located within said knob and being fixed with respect to an observer to indicate the revolutions made by said dial, a pinion gear located on one end of said shaft, a ring gear secured within said knob and engaging the teeth of said pinion so as to rotate said indicating mechanism when said operating knob is rotated.

HALLAN EUGENE GOLDSTINE.